(12) United States Patent
Groening et al.

(10) Patent No.: US 6,975,051 B2
(45) Date of Patent: Dec. 13, 2005

(54) COOLED PRIMARY OR SECONDARY PART OF AN ELECTRIC MOTOR

(75) Inventors: Ingolf Groening, Lohr am Main (DE); Thomas Schelbert, Rieneck (DE); Michael Heider, Frammersbach (DE); Bernd Schnurr, Lohr am Main (DE)

(73) Assignee: Rexroth Indramat GmbH, Lohr am Main (DE)

( * ) Notice: Subject to any disclaimer, the term of this patent is extended or adjusted under 35 U.S.C. 154(b) by 0 days.

(21) Appl. No.: 10/472,793

(22) PCT Filed: Mar. 27, 2002

(86) PCT No.: PCT/DE02/01121

§ 371 (c)(1),
(2), (4) Date: Feb. 23, 2004

(87) PCT Pub. No.: WO02/078150

PCT Pub. Date: Oct. 3, 2002

(65) Prior Publication Data

US 2004/0135441 A1 Jul. 15, 2004

(30) Foreign Application Priority Data

Mar. 27, 2001 (DE) .......................................... 101 15 186

(51) Int. Cl.⁷ ................................................ H02K 9/00
(52) U.S. Cl. ........................................ 310/58; 310/52
(58) Field of Search ..................................... 310/52–59

(56) References Cited

U.S. PATENT DOCUMENTS

| 1,650,558 A | | 11/1927 | White | |
| 2,390,130 A | * | 12/1945 | Sigmund et al. | 310/54 |
| 5,189,325 A | * | 2/1993 | Jarczynski | 310/54 |

FOREIGN PATENT DOCUMENTS

| AU | 93548 | 7/1923 |
| DE | 448 803 | 8/1927 |
| DE | 1 923 980 | 11/1970 |
| EP | 0 369 571 A | 5/1990 |
| FR | 2 089 422 | 12/1971 |
| WO | 01 54254 | 7/2001 |

OTHER PUBLICATIONS

Patent Abstracts of Japan vol. 004, No. 175 (E–036), Dec. 3, 1980 & JP 55 122438 A, Sep. 20, 1980.

* cited by examiner

*Primary Examiner*—Thanh Lam
(74) *Attorney, Agent, or Firm*—Michael J. Striker

(57) ABSTRACT

The invention relates to a primary part (1) or secondary part (31) of an electric motor (2), having a core (3) of a magnetically conductive material, which forms slots (4) for the windings (5), and at least one cooling tube (6), through which a coolant fluid (7) can flow, is inserted into the slots (4) under the windings (5). To assure that a primary part (1) or secondary part (31) of this kind is comparatively simple to produce and assemble and has increased cooling performance or increased cooling efficiency compared to the prior art, it is proposed that the effective slot cross section has an at least local retaining constriction (10, 11) relative to the cooling tube (6), so that the cooling tube is fixed by the retaining constriction (10, 11) in its seat in a receptacle region (12) of the slot (4), and the slot cross section in the receptacle region (12) has a contour (13) corresponding to the outer contour (14) of the cooling tube (6) in such a way that the cooling tube (6) has a surface contact (18) extending substantially over its length with the inner wall (19) of the receptacle region (12), the surface contact being at least local with respect to its outer circumference (17).

21 Claims, 3 Drawing Sheets

COOLED PRIMARY OR SECONDARY PART OF AN ELECTRIC MOTOR

BACKGROUND OF THE INVENTION

The invention relates to a primary part or secondary part to a method for producing such a primary part or secondary part, and to a forming die for performing the aforementioned method, In synchronous motors, it is the primary part with the windings that is cooled; in asynchronous motors, both the primary part and the secondary part can be cooled. The invention also pertains to rotary motors, but preferably to linear motors.

In such a motor, there are slots into which the windings for the coils are inserted. This applies to all types of windings, such as pole windings or windings for generating a migrating field.

As electrical current flows through the applicable windings, heat is generated, which—depending on the power of the motor—must be dissipated by means of suitable provisions for cooling. In the electric motors involved in the subject of the invention, the heat is dissipated by means of cooling tubes which are inserted into the slots below the windings.

For that purpose, it is known to insert a cooling tube into the slots—through the slot opening—before the windings are inserted. Depending on the cross section of the slot, the cooling tube is dimensioned such that it can be simply inserted into the slot and comes to rest on the slot bottom.

The core of the primary part or secondary part comprises a magnetically conductive material, such as stacked laminations, or a solid material in which the appropriate slots are made. In the case of stacked laminations, the laminations are stamped out individually and then joined together into a lamination packet, forming the slots in the process. In the case of solid material, the slots can be milled out, for instance.

Because the cooling tubes are inserted into the slots, the geometry of the slot and the cooling tube is predetermined in such a way that in their installed position, the cooling tubes are disposed on the slot bottom with air between them and the slot wall. Because of the undefined position of the cooling tubes, the windings located above them can contact the cooling tubes only linearly rather than uninterruptedly. This makes the overall cooling performance or cooling efficiency comparatively poor.

SUMMARY OF THE INVENTION

It is therefore the object of the present invention to disclose a primary part or secondary part of the type defined at the outset which is comparatively simple to produce and install and which has increased cooling performance or efficiency compared to the prior art.

The invention offers the advantage of increased cooling performance/efficiency along with simple manufacture and easy installation of a primary part or secondary part.

This advantage is attained by providing that by means of an at least local retaining constriction of the effective slot cross section relative to the cooling tube to be inserted, the cooling tube is fixed in its seat in a receptacle region of the slot. The slot cross section in the receptacle region has a contour that corresponds at least locally—viewed in the circumferential direction—with the outer contour of the cooling tube. These corresponding contours extend substantially over the length of the cooling tube, that is, over that length of the cooling tube to which the cooling tube is placed in a corresponding slot. The result, viewed over the aforementioned longitudinal length, is an at least local surface contact, circumferentially, with the inner wall of the receptacle region.

The cooling tube assumes a predetermined defined position in the receptacle region of the slot, in which the aforementioned surface contact exists. As a result, on the one hand the heat transfer resistance between the magnetically conductive material to be cooled and the wall of the cooling tube is reduced. The air gap between the outer wall of the cooling tube and the inner wall of the receptacle region is reduced substantially or even avoided entirely. In contrast to the prior art, a surface contact exists; that is, if the cooling tube—as in the prior art—rests relatively loosely in the receptacle region, then it is surrounded on practically all sides in terms of its circumference by an air gap, which forms a strong barrier to heat conduction. By comparison, in the surface contact of the invention, there is substantially better coupling with regard to heat conduction. This already substantially increases the cooling performance or efficiency. Because the seat of the cooling tube is defined exactly by the slot geometry, it is possible, for instance by using lines that have a larger cross section, to achieve a higher copper fill factor.

A further factor is that the cooling tube rests in a defined position in the receptacle region, so that the windings can be inserted in such a way that a preferably large-area contact also exists between the underside of the cooling windings and the top face of the introduced cooling tube. This will be addressed in further detail hereinafter.

For producing the at least local surface contact, the shape of the outer wall of the cooling tube corresponds to that of the wall of the receptacle region. This means that the curvatures involved—viewed over the circumference of the cooling tube—correspond locally to one another, resulting in an at least local areal contact. To assure uniform heat dissipation over the length of the cooling tube, the surface contact or surface contact zone extends circumferentially over practically the length of the cooling tube to which the cooling tube is inserted into the slot. The creation of hot spots is thus avoided, and homogeneous cooling is achieved.

The invention has recognized that a defined heat dissipation of this kind can be effected via a defined position of the cooling tube in the receptacle region. As a result, for each portion of the cooling tube or cooling tubes—even over a plurality of slots—homogeneous heat dissipation is assured; conversely, in the prior art, a largely undefined position of the cooling tube occurs, so that—depending on the random disposition of cooling tubes—heat nests can occur between adjacent slots, for instance, while other regions are more strongly cooled. In the prior art, because of these nonhomogeneities, the cooling tubes must be comparatively large, to assure always-adequate cooling even in the unpredictable terminal positions of the cooling tubes in the receptacle regions. This problem is eliminated completely by the invention. As a result, with the invention, the cooling flow can be made less and/or the cooling tubes can be made smaller, yet nevertheless, uniform and above all adequate cooling can still be assured. Thus with the invention the resultant cooling can be calculated, or calculated in advance, substantially more precisely and simply. As noted above, in the prior art there is always uncertainty in terms of the design. In the invention, this uncertainty is eliminated, since the clearly defined position of the cooling tubes means that their cooling efficiency is defined directly as well. The dimensioning can therefore be accomplished substantially more efficiently, accurately, and simply.

The retaining constriction can be merely local and for instance can extend over only a certain portion in the depthwise direction of the slot; and upon insertion, for instance at a press-fitting force to be exerted, it is possible to move past this portion, so that the cooling tube practically snaps into place. This too will be addressed in further detail hereinafter. The retaining constriction can also extend over practically a majority of the slot depth or the entire depth of the slot. Then the slot has a width, over a majority of its depth or over its entire depth, that is slightly less than the corresponding outside diameter of the cooling tube. As a result, the cooling tube is seated with a quasi-press-fit in the receptacle region and is to be thrust into its seat in the installed position through the retaining constriction at the press-fitting force. As a result of this provision as well, the advantage of the invention, which is that the cooling tube is disposed in a defined seat in the receptacle region and has the surface contact that is required for heat conduction, is already achieved.

Preferred features of the present invention are described in the dependent claims.

Since the cooling tube is fixed in its seat in the receptacle region and has a local surface contact with the wall of the receptacle region, a certain frictional engagement exists between the cooling tube and the receptacle region. In order therefore to minimize the force that is required to insert the cooling tube into the receptacle region, it is proposed that the cooling tube, upon insertion at the press-fitting force, can move past the local retaining constriction. As a result, the cooling tube can readily be inserted into its receptacle region from above through the slot opening in the depthwise direction of the slot, and the force of friction that has to be overcome is relatively slight; in fact, the force of friction has to be overcome only in the region of the retaining constriction, i.e., preferably merely locally—in terms of the depthwise direction of the slot. The result attained is that the cooling tube has to be pressed in or press-fitted over only a comparatively short distance while it is overcoming the force of friction.

It is proposed that the cooling tube be inserted laterally, that is, in the longitudinal direction of the slot, into the receptacle region. What is essential for the invention is that the cooling tube is fixed and has the required surface contact. Thus, without losing the aforementioned advantages, it can readily also be thrust inward laterally. That has the disadvantage that the retaining constriction can also be smaller than the outside diameter of the cooling tube, so that the cooling tube does not have to be able to move past the retaining constriction. This provides corresponding flexibility in dimensioning the retaining constriction and the slot cross section.

However, it already suffices if a local retaining constriction is provided only above the receptacle region. In that case, the retaining constriction is merely local, and the cooling tube can move past it preferably in the depthwise direction of the slot. Once again, this has an advantage in terms of the degree of freedom in dimensioning the slot geometry: The slot width can be equal to or greater than the definitive cross section of the cooling tube, so that more space for the windings can for instance be provided.

The retaining constriction can be embodied as a retaining protrusion. In that case it is preferred that the cooling tube virtually snaps into its seat and is held/fixed/pressed by the retaining protrusion, so that the surface contact is assured.

The retaining protrusion can be formed by one retaining strut each and/or one or more retaining lugs of one or both slot walls. Preferably, opposed retaining struts of the slot walls are provided, which form a detent lock for the cooling tube. The aforementioned features have the advantage that the slot width can be greater than the effective slot cross section in the region of the retaining protrusions/retaining struts, so that the cooling tube can be placed in the slot very easily up to the retaining protrusions, and merely a greater contact-pressure/press-fitting force has to be brought to bear to overcome the detent force.

The cooling tube in its seat in the receptacle region may be pressed at least locally, in terms of its outer circumference, against the inner wall of the receptacle region by the retaining constriction. In that case, a detent lock is for instance provided that presses the cooling tube in its seat against the applicable zones of the wall of the receptacle region. At the same time, however, the cooling tube is seated, firmly held by positive engagement, in its seat.

To prevent local damage to or deformation of the cooling tube in its seat, it is proposed that the cooling tube, in its seat in the receptacle region, rests on the underside of the retaining constriction, and that the retaining constriction has a contour there that corresponds with the contacting part of the outer circumference of the cooling tube. Then on the one hand the cooling tube is retained by positive engagement and pressed in its seat against the wall of the receptacle region, but on the other hand, it is assured that practically no zones of increased stress are created in the region of contact on the retaining constriction. Moreover, the surface contact is enlarged still further as a result, namely by the applicable portion of contact of the retaining constriction or of the cooling tube.

In order to assure effective overall heat dissipation, it is proposed that a surface shape which forms a practically areal support for the windings located above it is embossed on the cooling tube on its top face. The surface shape can be embossed before the cooling tube is inserted. Preferably, however, the cooling tube is deformed in the appropriate way in the insertion operation or at the conclusion of the insertion operation. This will be addressed in further detail hereinafter. The result is an improvement in heat dissipation, since the heat source—namely the windings—themselves rest partly on the cooling tube, and there is thus a direct transfer of heat between the heat source and the cooling tube.

It suffices if the contact is only over a partial area relative to the slot width, but preferably it is over practically a full area across the slot width.

The invention also relates to a method for producing a primary part or secondary part of one of claims 1–12. This method, too, attains the object stated above and offers a simple, effective method for producing such a device. It can be provided that the cooling tube is inserted laterally, that is, in the longitudinal direction of the slot, into the receptacle region. This has the aforementioned advantages of the lateral insertion.

Preferably, it is proposed that the cooling tube is pressed into the slot by a forming die corresponding with the slot geometry, and the local retaining constriction is embodied in such a way, taking the cooling tube geometry and the cooling tube material into account, that the cooling tube can move past it with solely elastic deformation. The forming die corresponds with the slot geometry in such a way that on the one hand it is to be inserted into the slot opening and can be introduced far enough that the cooling tube can be displaced into its seat and optionally snaps into place. To that end, the forming die protrudes with a foot of the die as far as necessary into the slot opening. The at least local retaining constriction is embodied such that the cooling tube is only elastically deformed upon insertion, and practically no permanent deformations remain after the insertion. Then the cooling tube in its seat is completely undamaged.

In its seat in the receptacle region, the cooling tube is preferably given an embossed surface form of claim 12 by the forming die, by means of plastic deformation. As a result, a corresponding deformation of the cooling tube before the insertion is unnecessary. The deformation and insertion are then practically a single work step, thus considerably reducing the overall effort and expense of installation. As a result, specifically, some of the production— namely making the embossing of the surface shape—is accomplished simultaneously with the installation. To that end, the forming die is embodied such that on its underside, it has a shape that is essentially a negative of the surface shape.

To minimize or preclude stress on the forming die, or on the—preferably only local—retaining constriction, it is proposed that the forming die, on its underside, has a geometry that deviates laterally from the retaining constriction, so that on being press-fitted, the retaining constriction is not touched/damaged by the forming die.

The cooling tubes can be embodied in the form of a cooling coil. In that case, the forming die can be dimensioned such that it has only one plunger rib corresponding to the slot geometry with respect to the operation of press-fitting the cooling tube. This is readily practicable in a cooling coil with a cooling tube made of a material that is not overly brittle. Specifically, in that case the cooling coil is merely maximally deflected—in the individual press-fitting insertion of the cooling distances—by the cooling tube diameter relative to adjacent cooling distances, which diameter for conventional cooling coils is located in the region of the solely elastic deformation. This is true for the case where the cooling distance that is next to the cooling distance of the cooling coil in the receptacle region is at least inserted into the slot and rests on the retaining struts.

Alternatively, it can also be provided that the forming die has a plurality of plunger ribs corresponding to the slot geometry with respect to the operation of press-fitting the cooling tube. Then for the press-fitting/pressing-in, fewer work steps are needed. The press-fitting can be accomplished in only a single work step, if the number and/or disposition and/or geometry of the plunger ribs corresponds to the number and/or disposition and/or geometry of those slots in each of whose receptacle regions a respective cooling tube is provided. This tube can be used in a conventional cooling coil, or can also be used in the form or radiator in which the cooling distances branch off into the slots at right angles from a primary cooling line, and deformation in the region of the branching points must therefore be avoided.

BRIEF DESCRIPTION OF THE DRAWINGS

The invention will be described in further detail in terms of exemplary embodiments shown in the drawing. Shown are.

DETAILED DESCRIPTION OF THE PREFERRED EMBODIMENTS

Figure 1:
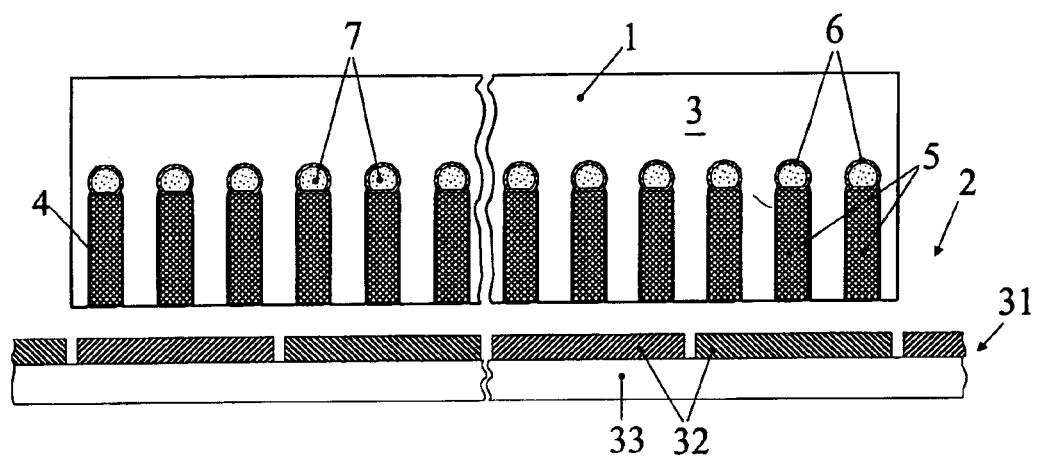
FIG. 1, a schematic cross section through a secondary part and a primary part of a linear motor.

Unless otherwise noted below, all the reference numerals always apply to all the drawing figures.

FIG. 1 schematically shows a cross section through a linear motor 2 with a primary part 1 and a secondary part 31. The secondary part 31 substantially comprises a secondary part magnet holder 33, to which permanent magnets 32 are glued adjacent one another in the longitudinal direction and in the transverse direction. These permanent magnets 32 interact with the windings, through which current flows in a predetermined way, of the primary part 1. To that end, the windings 5 rest in slots 4 that are present in the core 3. Under the windings 5, there are cooling tubes 6 in each of the slots 4, or one cooling tube 6, through which a coolant fluid 7 flows. The coolant fluid 7 can for instance be water, oil, or a coolant gas.

The heat that occurs from the current in the windings 5 is so high—particularly in linear motors, but also in high-power rotary motors—that the primary part 1 is actively cooled.

Figure 2:
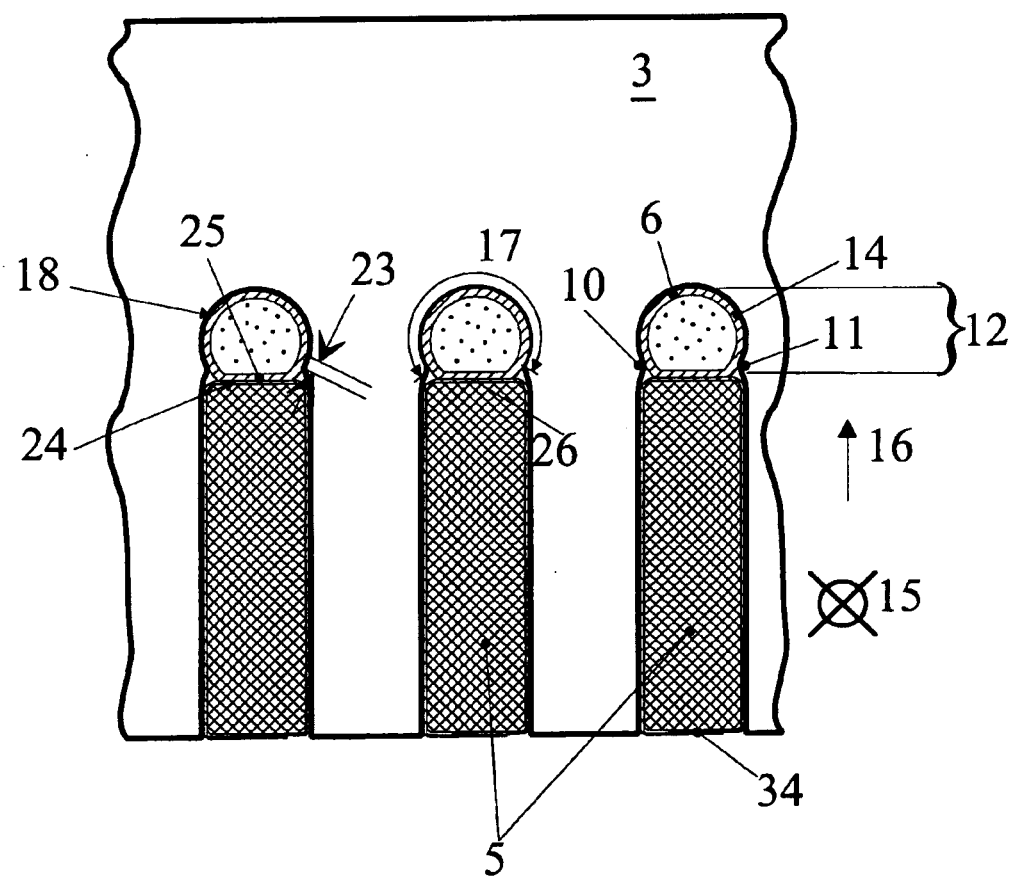
FIG. 2, an enlarged detail from FIG. 1.

The detail view in FIG. 2 shows the design of the slot 4, winding 5 and cooling tube 6 in detail:

The effective slot cross section 8 (see the description of FIG. 3 below) is formed by a retaining constriction, in the form of two opposed retaining struts 10, 11, opposite one another at the same point in a retaining constriction region 9 in the depthwise direction 16 of the slot, in the respective slot walls 20, 21. The retaining struts 10, 11 continue— although not shown here—without interruption in the longitudinal direction 15 of the slots 4. The result is a receptacle region 12 which is undercut with respect to each of the slots 4 and in which the cooling tube 6 is seated. Because of the undercutting of the retaining struts 10, 11, the cooling tube is fixed there in such a way, specifically taking its outer contour 14 and the contour 13 of the slot cross section in the receptacle region 12 into account, that it has an at least local surface contact 18, in terms of its outer circumference 17, with the inner wall 19 of the receptacle region 12 (in this respect see also FIG. 3), which contact extends essentially over its length (viewed in the longitudinal direction 15).

The surface contact extends in cross section over practically the entire portion 17 of the outer circumference 17 shown. For the sake of simplicity in the drawing, only one reference numeral 17 was selected. However, it can readily be seen that on the one hand, this means the general outer circumference 17 of the cooling tube 6, and on the other, it means the circumferential zone over which the surface contact is assured. It is also possible for the surface contact to be present over only part of the outer circumference 17 shown.

The retaining struts 10, 11 are below—as defined here, in terms of the depthwise direction 16—the windings 5. In the installed configuration, they are practically "buried" under the windings 5. As a result, the cooling tube 6 is seated overall in a defined and predetermined way in the receptacle region 12. The cooling tube 6 rests with the corresponding contact zones 23 of its outer circumference on the underside of the retaining struts 10, 11. The geometry and disposition of the retaining struts 10, 11 are selected such that the cooling tube in this seat is pressed against the inner wall 19 of the receptacle region 12. This means that the cooling tube 6 is retained with slight pressure in the undercut receptacle region 12. Taking the cooling tube geometry and the cooling tube material into account, the pressure is selected by way of the appropriate dimensioning and disposition of the retaining struts 10, 11.

In the contact zone 23, the retaining struts 10, 11 have a contour that corresponds locally with the outer circumference 17 of the cooling tube 6, so that the appropriate pressure is exerted without excessively deforming or damaging the cooling tube 6. The retaining struts 10, 11, viewed over the course of their depth, have a practically rounded contour, so that even in the process of press-fitting/pressing-in through this bottleneck, the cooling tube 6 is indeed deformed only elastically, but is not plastically deformed, scratched, or damaged. This will be addressed in further detail hereinafter.

In FIG. 2 it can be seen clearly that the cooling tube 6 has a flattened, practically level shape on its top face 24. This shape is practically equivalent to a flattening 25 of the top face 24 of the cooling tube 6 over the longitudinal length of the cooling tube 6 (viewed in the longitudinal direction 15 of the slots 4), so that a practically homogeneous contact is assured over the longitudinal length as well. Specifically, in the installed configuration, the windings 5 rest with their underside directly on this flattening 25 of the top face 24 of the cooling tube 6; in the exemplary embodiment shown, this means that they rest there with their slot insulation 34; if there is no such slot insulation 34, then the windings rest there directly with their conductor insulation.

As a rule, the slot insulation 34 is so thin that heat conduction is impaired by it only slightly, if at all. Because of the areal, partial-areal or full-areal contact, very good heat-transfer contact and thus very low heat-transfer resistance between the flattening 25 and the support 26 of the windings 5 are achieved.

Figure 3:
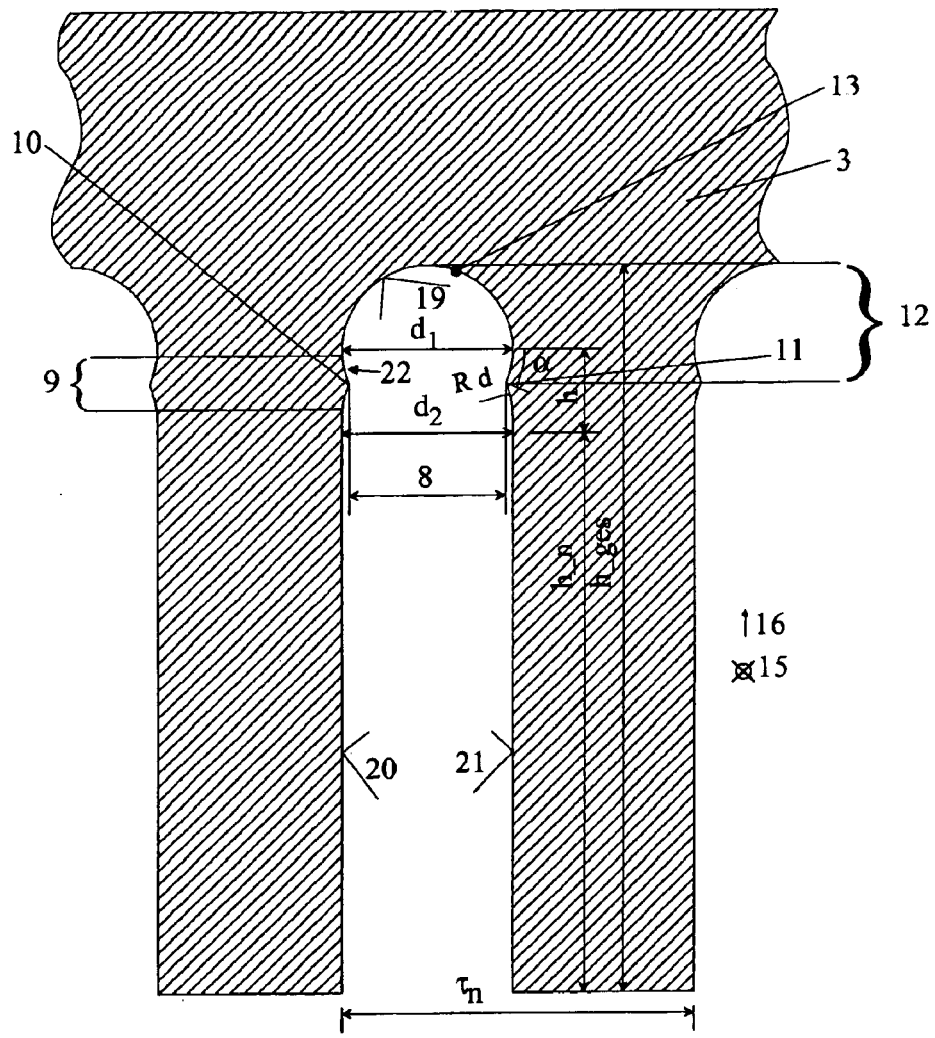
FIG. 3, a cross-sectional view of a detail of a slot in the primary part of FIG. 1 and FIG. 2 without the cooling tube and without windings.

The slot geometry is shown in detail in FIG. 3. One slot width $d_2$, plus the width of an adjacent tooth, corresponds to a slot pitch $\tau_n$. The slot pitch $\tau_n$ can be predetermined by the motor parameters, so that the slot geometry according to the invention is to be designed in accordance with the requisite motor parameters. This means that—for a predetermined or restricted slot width $d_2$—there should be an effective slot cross section 8 adapted to this and to the cooling tube. The diameter $d_1$ of the receptacle region 12 is predetermined essentially by the needs of the corresponding contacting faces of the cooling tube 6 and inner wall 19 of the receptacle region 12.

The total height $h_{ges}$ is composed essentially of the height of the receptacle region 12, plus the portion of the slot depth that remains for the windings 5.

As an example, in FIG. 3 a radius of curvature $R_d$ in the region of the retaining struts 10, 11 is shown; the critical factor here is that these retaining struts 10, 11—to assure nondamaging press-fitting of the cooling tube 6—are rounded in the region above (that is, below in the drawing) the highest point of the retaining struts 10, 11, and in the region of the tips of the retaining struts 10, 11.

Figure 4:
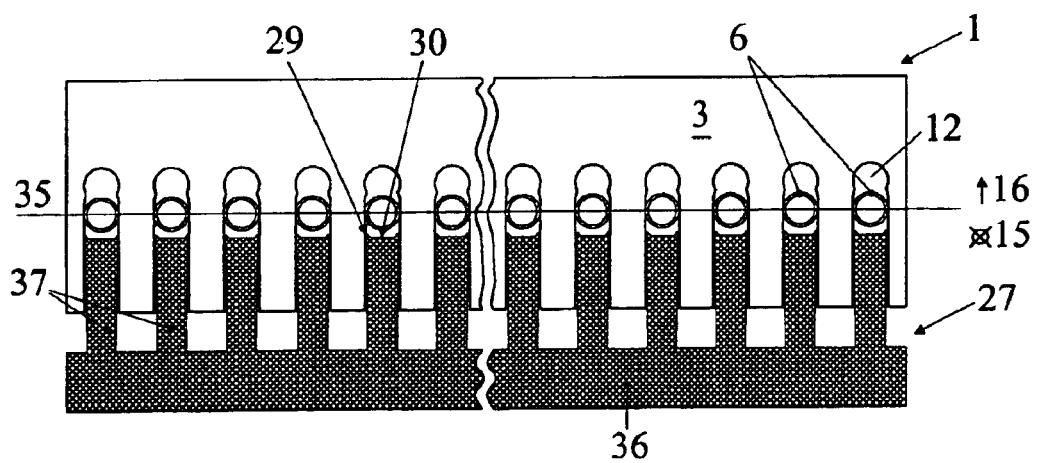
FIG. 4, a schematic cross section through a primary part, while the cooling tube or tubes are about to be press-fitted in/pressed in with a forming die.

FIG. 4 shows a schematic cross section through a primary part 1 which is just now being equipped with the cooling tube 6. The cooling tube 6 is inserted partway into the slot 4, in the depthwise direction 16 of the slot, and has not yet reached the retaining struts 10, 11. Above it is a forming die—in this case a multiple die 27—that has as many plunger ribs 37 as there are slots 4 with cooling tubes 6 placed in them. This means that in one work step, with one forming die 27, one cooling tube 6 or a plurality of cooling tubes 6 can be pressed/press-fitted into their inserted position 35 into all the slots 4, or into many slots 4.

The forming die 27 comprises the aforementioned plunger ribs 37, which correspond to the slot geometry to the extent that they are somewhat narrower than the slot width $d_2$. However, they are preferably at least as high as the slot depth up to the position of the retaining struts 10, 11. They are elongated in the longitudinal direction 15 and extend over practically the entire length of the inserted portions of the cooling tubes 6. This prevents the cooling tubes from being inserted unevenly or even canted.

The cooling tubes 6 can move past the retaining constriction 10, 11 in the depthwise direction 16 of the slot and can virtually snap into place in their receptacle region 12, if a sufficient press-fitting/pressing-in force is exerted by the forming die 27.

Figure 5:
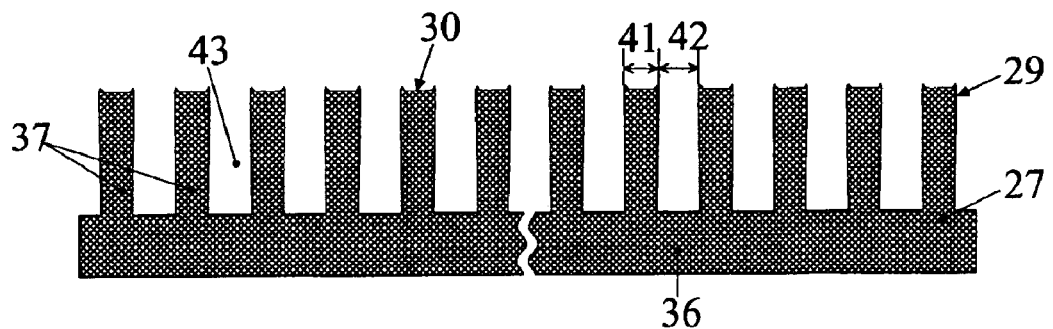
FIG. 5, a schematic cross section through a multiple forming die.

In FIG. 5, a multiple die 27 is schematically shown, which—as in all the exemplary embodiments shown, including the primary part 1 and secondary part 31 of the linear motor 2—is shown interrupted. On the underside 29 of the forming die 27, the plunger ribs 37 have a shape 30 that is essentially a negative shape 30 of the surface shape 25—which in the exemplary embodiment shown is a level shape. This shape 30 is accordingly likewise plane. However, this is true only for the central part of the underside 22 or of the shape 30.

The rib width 41 is at least slightly less than the slot width $d_2$, so that the plunger ribs 37 can plunge into the slots 4 without becoming canted and without inhibition. To attain a practically uncanted/uninhibited insertion, the forming die can be introduced with at least one plunger rib into the slot, and the plunger rib narrows at least in some portions, and in particular toward a base of the die. The rib width 41 is furthermore dimensioned such that—precisely in the case of a multiple die 27—even taking into account possible changes in position with regard to parallelism between the base 36 of the die and the primary part 1, or its relative tilting, an essentially uninhibited plunging inward of the plunger ribs is still always assured. To that end, the material comprising the plunger ribs 37 or the entire forming die 27 can be selected accordingly to have a low coefficient of friction. Steel such as St37 or a high-strength steel can be used, including steel with a teflon coating. However, it should be noted that the force to be exerted by the forming die 27 and thus the stability of the material must be assured. Analogously, the width 42 of the interstice 43 is at least slightly greater than the tooth width.

Figure 6:
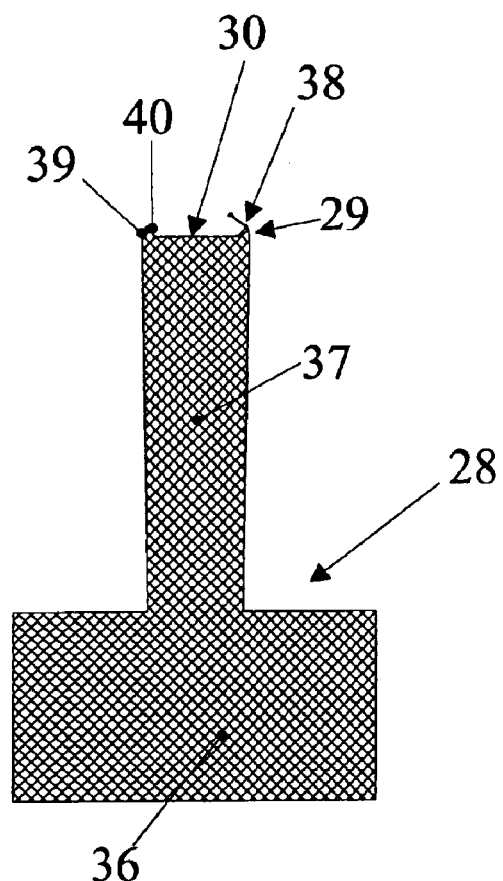
FIG. 6, a schematic cross section through a single forming die.

In FIG. 6, a single die 28 is shown, which is capable of pressing in individual cooling tubes 6, or portions of cooling tubes 6 individually, into a slot 4 intended for it. Besides the base 36 of the die, only a single plunger rib 37 is provided, which can plunge successively into a given slot 4 in order to press-fit the cooling tube 6. However, a plurality of single dies 28 may also be provided, which simultaneously equip various slots 4 with the cooling tube 6.

As an example of a multiple die 27 as in FIG. 5, FIG. 6 because of its larger view also illustrates the precise contour of the shape 30 of the underside 29 of the plunger rib 37 in more detail. At the edge of the underside 29 of the plunger rib 37, lateral struts 38 are provided, whose respective outer edges spring back laterally at the outside 39 and thus are embodied as "deviating", upon the press-fitting in of the retaining constriction 10, 11, in such a way that the retaining constriction 10, 11 and/or the plunger rib 37 on being pressed in do not touch one another and cannot damage one another. By comparison, the lateral struts 38 on the respective inside 40 drop away rapidly toward the center of the plunger rib 37, so that the remaining space for the surface shape 30 for embossing the shape of claim 12 is as large as possible and can be utilized to a great proportion for embossing the shape.

What is claimed is:

1. A primary part (1) or secondary part (31) of a linear motor (2), having a core (3) of a magnetically conductive material, which forms slots (4) for the windings (5), and at least one cooling tube (6), through which a coolant fluid (7) can flow, is inserted into the slots (4) under the windings (5), characterized in that the effective slot cross section has an at least local retaining constriction (10, 11) relative to the cooling tube (6), so that the cooling tube is fixed by the retaining constriction (10, 11) in its seat in a receptacle region (12): of the slot (4), and the slot cross section in the receptacle region (12) has a contour (13) corresponding to the outer contour (14) of the cooling tube (6) in such a way that the cooling tube (6) has a surface contact (18), extending substantially over its length, with the inner wall (19) of the receptacle region (12:, the surface contact being at least local with respect to its outer circumference (17), wherein the cooling tube (6) has a flattened level shape on a top face (24) for supporting (26) the windings (5) located above the cooling tube (6).

2. The primary part or secondary part of claim 1, wherein the cooling tube (6) upon insertion at the press-fitting force can move past the local retaining constriction (10, 11).

3. The primary part or secondary part of claim 2, wherein the cooling tube (6) is meant to be inserted into the slot (4) from above through the slot opening.

4. The primary part or secondary part of claim 1 or 2, wherein the cooling tube (6) is meant to be inserted into the receptacle region (12) laterally in the longitudinal direction of the slot.

5. The primary part or secondary part of claim 4, wherein the local retaining constriction (10, 11), taking the cooling tube cross section into account, is so narrow that the cooling tube (6) cannot move past it, as viewed in the depthwise direction (16).

6. The primary part or secondary part of claim 1, wherein a local retaining constriction (10, 11) is provided only above the receptacle region (12).

7. The primary part or secondary part of claim 6, wherein a retaining constriction (10, 11) is embodied as a retaining protrusion.

8. The primary part or secondary part of claim 7, wherein the retaining protrusion is formed by one retaining strut (10, 11) each and/or one or more retaining lugs of one or more slot walls (20, 21).

9. The primary part or secondary part of claim 8, wherein opposed retaining struts (10, 11) of the slot walls (20, 21) are provided, which form a detent for the cooling tube (6).

10. The primary part or secondary part of claim 1, wherein the cooling tube (6) in its seat in the receptacle region (12) is pressed at least locally, in terms of its outer circumference (17), against the inner wall (19) of the receptacle region (12) by the retaining constriction (10, 11).

11. The primary part or secondary part of claim 10, wherein the cooling tube (6), in its seat in the receptacle region (12), rests on the underside (22) of the retaining constriction (10, 11), and that the retaining constriction (10, 11) has a contour there that corresponds with the contacting part (23) of the outer circumference (17) of the cooling tube (6).

12. The primary part or secondary part of claim 1, wherein a surface shape (25) which forms a practically flat support (26) for the windings (5) located above it is embossed on the cooling tube (6) on its top face (24).

13. A method for producing a primary part or secondary part of claim 1, wherein the cooling tube (6) is thrust laterally into the receptacle region (12) in the longitudinal direction of the slot.

14. The method for producing a primary part or secondary part of claim 1, wherein the cooling tube (6) is pressed into the slot 14) by a forming die (27, 28) corresponding with the slot geometry, and the local retaining constriction (10, 11) is embodied in such a way, taking the cooling tube geometry and the cooling tube material into account, that the cooling tube (6) can move past it with solely elastic deformation.

15. The method of claim 14, wherein the cooling tube (6) in its seat in the receptacle region (12) is given an embossed surface shape (25) of claim 12 by the forming die (27, 28) by means of plastic deformation.

16. A forming die for performing the method of claim 14, wherein the forming die (27, 28), on its underside (29), has a geometry that laterally deviates from the retaining constriction (10, 11), so that on being press-fitted, the retaining constriction (10, 11) is not touched/damaged by the forming die (27, 28).

17. A forming die, in particular of claim 16, for performing the method of claim 14, wherein the forming die (27, 28), on its underside (22), has a shape (30) that is essentially negative relative to the surface shape (25) of claim 12.

18. The forming die of claim 17, wherein the forming die (27) has only one plunger rib (37) corresponding to the slot geometry with respect to the operation of press-fitting the cooling tube (6).

19. The forming die of claim 17, wherein the forming die (27) has a plurality of plunger ribs (37) corresponding to the slot geometry with respect to the operation of press-fitting the cooling tube (6).

20. The forming die of claim 19, wherein the number and/or disposition and/or geometry of the plunger ribs (37) corresponds to the number and/or disposition and/or geometry of those slots (4) in each of whose receptacle regions (12) a respective cooling tube (6) is provided.

21. The forming die of claim 16, wherein the forming die (27) is to be introduced into the slot (4) with at least one plunger rib (37), and the plunger rib (37) narrows at least in some portions, in particular toward a base 36 of the die.

* * * * *